May 7, 1929.  R. FRITSCHE  1,712,428

PROCESS OF TONING BLUEPRINTS GREEN

Filed July 6, 1927

*Plain Paper*

*Coated Paper Dry*

*Exposed*

*Washed Wet. Blue*

*Dipped in new Solution Blue to Green*

*Washed and Dryed Green*

WITNESSES

INVENTOR
Rudolf Fritsche
BY
ATTORNEYS

Patented May 7, 1929.

1,712,428

UNITED STATES PATENT OFFICE.

RUDOLF FRITSCHE, OF NEW YORK, N. Y.

PROCESS OF TONING BLUEPRINTS GREEN.

Application filed July 6, 1927. Serial No. 203,808.

This invention relates to an improved process for toning blueprints, the object being to provide a process whereby blueprints may be toned so that they will turn to a permanently green color with substantially white lines.

A further object of the invention is to provide a process for toning blueprints green, wherein uranium salts are used as part of the toning solution.

In the accompanying drawing—

Figure 1:
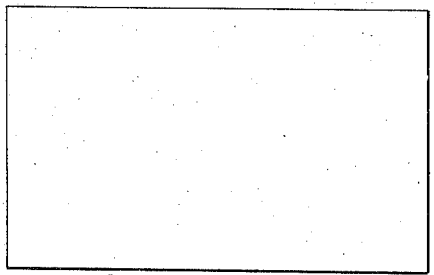
Figure 1 represents a sheet of plain paper or cloth.
Figure 2:
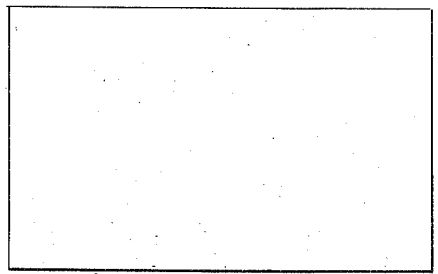
Figure 2 is a plan view of the sheet shown in Figure 1, but coated with what is commonly known as a blue printing compound.
Figure 3:
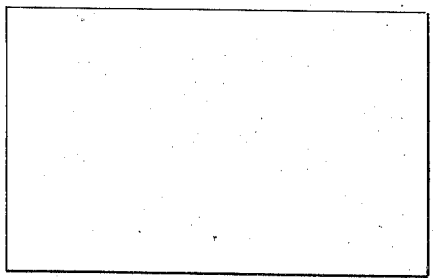
Figure 3 is the same sheet illustrated in Figure 2, but exposed to a light for printing purposes.
Figure 4:
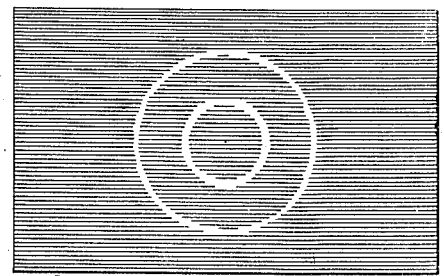
Figure 4 is a plan view of the sheet shown in Figure 3, but washed in water and still in a wet condition.
Figure 5:
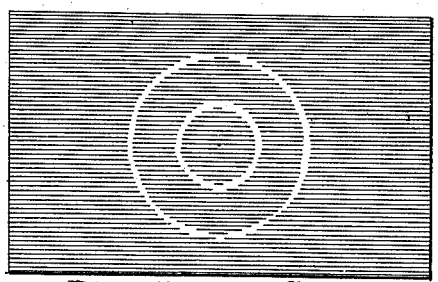
Figure 5 is a plan view of the sheet shown in Figure 4 after the same has been passed through a second washing solution.
Figure 6:
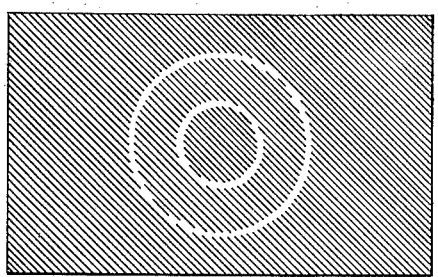
Figure 6 is a plan view of the sheet shown in Figure 5, after the same has been washed in water and dried.

In making blue print paper or blue print cloth, it has been customary to use several different chemical preparations which produce a coating on the paper sensitive to light so that a tracing cloth, glass or other transparent object with pictures, drawings or characters thereon may be placed between the coated paper and the light, and in this way the paper exposed. This action will cause the light to produce a chemical action on the coated paper so that when the paper and coating are washed in water, the coating will turn blue and the parts not exposed to light will turn or remain white.

In order to carry out the present invention, preferably a certain solution is used to make the sensitive coating. This solution preferably is made in two batches and then mixed and filtered so that the filtered mixture may be placed on the paper. The solution consists preferably in the following ingredients and proportions:

1. 5 oz_____Potassium-ferri-cyanide
   50 oz_____Water
2. 15 oz_____Ferric ammonium citrate
   50 oz_____Water After the paper has been coated with this solution, it is allowed to dry in a dark place and then it is ready for use. Where it is exposed in the usual way to make a print, the light shining through the tracing paper or glass, where there are no lines of a drawing or picture, will cause a chemical action so as to reduce the ferric salt to a ferrous salt. This gives with the ferri-cyanide a precipitate of an iron salt commonly known as Turnbull's blue.

After the sensitized paper has been exposed in the usual manner, it is washed in water which develops the coating and fixes the same. The fixing is not as satisfactory as might be desired, though it answers for commercial purposes as there is nothing better to be had.

Blue prints of any kind will quickly fade in a bright sunlight and will fade more slowly in a moderate light and even in comparatively dark places. Also, the color and the chemicals used, will injuriously affect the eyes of the person compelled to examine prints more or less continuously year in and year out.

After the blue print has been made as above described, and while it is still wet from the washing and fixing water, it is placed in a second solution for a short time, as for instance, one minute, and then removed to a washing water. The second solution causes the print to turn green, except along the white lines, and the water acts as a cleaning and a fixing solution. This second solution for turning the blue print green, preferably consists of a mixture as follows:

1. 1 oz___Uranium nitrate (solid)
   100 oz___Water
2. 1 oz___Potassium-ferri-cyanide (solid)
   100 oz___Water
3. 10 oz___Acetic acid (solution)

While the blue print is still wet from the water, it is dipped in the above solution and washed in this solution until the blue changes to an intensified dark green. This action usually takes about one minute, though a longer time might be used, or even a shorter time, and good results secured. The chemical action of the uranium salts on the ferrous-ferri-cyanide, changes the precipitate of the Turnbull's blue to ferrous-ferri-uranium, which results in a dark green color, except on the white lines which remain as sharp as in the blue print. The same result may be secured without the acid, but the washing action would require much longer and, therefore, the acid is used to expedite the washing.

It has been found by experiment, that practically all salts of uranium have the property to act in the above mentioned manner. By actual experiment, uranium chloride, uranium fluorid, uranium oxalate, uranium acetate and uranium citrate, have been tried with good results. Also, the uranium salt can be used without the potassium ferri-cyanide, but when this is done, the green color of the finished print will be much lighter. Also, the use of the acid in addition to expediting the washing, has the action of keeping the white lines in the print clearer. In addition to using the particular acid mentioned, other organic acids may be used such as citric acid, hydrochloric acid may also be used.

From the above it will be noted that a blue print is first made from a particular solution which is known on the market, and after the blue print has been exposed and washed in water, it is placed in a second solution while in the wet condition and maintained in the second solution until the blue turns green, and then is removed and washed in water. The washing in water may take a few minutes or as long as desired. In producing green prints, preferably the blue prints are taken from the washing water and put immediately into the solution for turning the same green, as this expedites the completion of the green print. It is, however, evident that a dry blue print could be subjected to the second solution for turning the same green. Where a builder or other person has a large number of blue prints on hand, they could be dipped in or subjected to the second solution and efficient results secured.

What I claim is:

1. The method of producing green prints from blue print images composed of ferrous-ferri-cyanide which consists in subjecting such prints to a solution of uranium salt until the uranium salt changes the blue surface of the prints to a green surface and then washing the prints in water.

2. The method of producing green prints from blue print images composed of ferrous-ferri-cyanide which consists in subjecting such prints to water until they are wet, then to a solution of uranium salts while the prints are still wet and maintaining the prints in the uranium salt solution until the chemicals on the blue prints have reacted with the uranium salts to produce a green surface and then washing the prints in water.

3. The method of producing green prints from blue print images composed of ferrous-ferri-cyanide which consists in subjecting such prints to a solution of uranium salts and potassium ferri-cyanide until the blue surface turns to a green surface and then washing the prints in water.

4. The method of producing green prints from blue print images composed of ferrous-ferri-cyanide which consists in subjecting such prints to a solution of uranium salts and potassium ferri-cyanide while the prints are still wet and finally washing the prints in water.

5. The method of producing green prints from blue print images composed of ferrous-ferri-cyanide which consists in subjecting said prints to a solution of uranium salts, potassium-ferri-cyanide and an organic acid until the blue surface of the prints turns to a green surface and finally washing the prints in water.

RUDOLF FRITSCHE.